United States Patent [19]
Martinez et al.

[11] 4,212,776
[45] Jul. 15, 1980

[54] SELF CROSSLINKING WATER DISPERSIBLE EPOXY ESTER-ACRYLATE POLYMERS

[75] Inventors: Carlos J. Martinez, Edison; Michael A. Tobias, Bridgewater, both of N.J.

[73] Assignee: Mobil Oil Corporation, New York, N.Y.

[21] Appl. No.: 951,920

[22] Filed: Oct. 16, 1978

[51] Int. Cl.² ............................ C09D 3/58; C09D 3/76
[52] U.S. Cl. ............................ 260/18 EP; 260/23 EP; 428/418
[58] Field of Search ............... 260/18 EP, 23 EP; 428/418

[56] References Cited
U.S. PATENT DOCUMENTS

| | | | |
|---|---|---|---|
| 3,631,127 | 12/1971 | Nomura et al. | 260/23 EP |
| 3,661,818 | 5/1972 | Guldenpfennig | 260/23 EP |
| 4,098,735 | 7/1978 | Tobias | 260/18 EP |
| 4,104,215 | 8/1978 | Aimono et al. | 260/23 EP |
| 4,116,901 | 9/1978 | Sekmakas et al. | 260/23 EP |
| 4,128,515 | 12/1978 | Tobias et al. | 260/18 EP |

*Primary Examiner*—Ronald W. Griffin
*Attorney, Agent, or Firm*—Charles A. Huggett; Hastings S. Trigg; Edward J. Trojnar

[57] ABSTRACT

Water reducible self crosslinking epoxy ester-acrylate polymers are prepared by partially esterifying the epoxy groups of a polyepoxide with an ethylenically unsaturated fatty acid or a saturated fatty acid and copolymerizing the ester product with monoethylenically unsaturated monomers including methacrylic acid and an alkoxymethylacrylamide or alkoxymethylmethacrylamide, to afford a self crosslinking acid copolymer. This copolymer is solubilized in water with a volatile base, e.g., ammonia, trimethylamine, or dimethylethanolamine. Formulations based on these polymers are useful as metal coatings.

12 Claims, No Drawings

SELF CROSSLINKING WATER DISPERSIBLE EPOXY ESTER-ACRYLATE POLYMERS

BACKGROUND OF THE INVENTION

1. Field of the Invention

This invention is concerned with epoxy ester-acrylate polymers and coating compositions containing them.

2. Description of the Prior Art

Insofar as is now known the polymers of this invention have not been proposed.

SUMMARY OF THE INVENTION

This invention provides a copolymer comprising a polyglycidyl ether of a bisphenol partially esterified with an ethylenically unsaturated fatty acid or a saturated fatty acid, copolymerized with a mixture of monoethylenically unsaturated monomers containing methacrylic acid and alkoxymethylacrylamide or alkoxymethylmethacrylamide.

It also provides water reducible coating compositions containing such copolymers and with metal substrates coated therewith.

DESCRIPTION OF SPECIFIC EMBODIMENTS

In general, the water reducible resins of this invention are prepared by adducting sufficient unsaturated monocarboxylic acid to a diglycidyl ether of a bisphenol to react with up to 75% of the epoxy groups. The diglycidyl ether is usually heated to melt and the monocarboxylic acid is added. The adduction is usually continued in a suitable solvent at about 150° C. for 1–2 hours until the acid number is about 1.0 or less.

Suitable solvents are ketones, ethers, and esters. Non-limiting examples of suitable solvents are methyl ethyl ketone, methyl n-propyl ketone, methyl isobutyl ketone, methoxy acetone, diisobutyl ether, and n-propyl acetate, n-butyl acetate, isobutyl acetate, n-propyl propionate, and ethyl butyrate. Ketones are especially preferred.

Then, a mixture of unsaturated monomers and free radical initiator is added. The mixture of monomers will include methacrylic acid and N-(alkoxymethyl)acrylamide or N-(alkoxymethyl)-methacrylamide. Usually, the polymerization reaction is carried out at about 75°–125° C., with portionwise addition of monomer and catalyst mixture during 1 to 5 hours. After addition is complete, reaction is continued for about an hour and, usually, additional catalyst is added and reaction is continued for up to an additional hour.

The epoxy resin utilizable herein is a diglycidyl ether of a bisphenol, a class of compounds which are constituted by a pair of phenolic groups interlinked through an aliphatic bridge. While any of the bisphenols may be used, the compound 2,2-bis(p-hydroxy phenyl) propane, commonly known as bisphenol A, is more widely available in commerce and is preferred. The diglycidyl ethers of bisphenol A are readily available commercially. The epoxy resin, i.e., the diglycidyl ether of a bisphenol, will have an epoxy equivalent weight between about 180 and about 4000.

The aliphatic monocarboxylic (fatty) acids utilizable herein have between 6 and 18 carbon atoms and a molecular weight between about 112 and about 290. Mixtures of monocarboxylic acids are contemplated. Non-limiting examples of the aliphatic monocarboxylic acids and mixtures thereof are hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, sorbic acid, oleic acid, linoleic acid, linolenic acid, ricinoleic acid, linseed fatty acids, cottonseed fatty acids, castor oil fatty acids, dehydrated castor oil fatty acids, and tung oil fatty acids. The amount of aliphatic monocarboxylic acid used will be sufficient to react with up to about 75% of the epoxy groups.

The mixture of ethylenically unsaturated monomers utilizable to make the copolymer resins of this invention must include methacrylic acid and N-($C_1$–$C_4$ alkoxymethyl) acrylamide or N-($C_1$–$C_4$ alkoxymethyl) methacrylamide. Non-limiting examples of these monomers include methacrylic acid, N-(methoxymethyl)acrylamide, N-(methoxymethyl)methacrylamide, N-(ethoxymethyl) acrylamide, N-(ethoxymethyl)-methacrylamide, N-(propoxymethyl) acrylamide, N-(propoxymethyl)methacrylamide, N-(isobutoxymethyl) acrylamide, N-(isobutoxymethyl)-methacrylamide, styrene, α-methylstyrene, vinyltoluene, isoprene, methyl acrylate, methyl methacrylate, ethyl acrylate, propyl acrylate, isopropyl acrylate, n-butyl acrylate, butyl methacrylate, isobutyl methacrylate, hexyl acrylate, 2-ethylhexyl methacrylate, 2-ethylhexyl acrylate, decyl acrylate, decyl methacrylate, and lauryl acrylate.

The ethylenically unsaturated monomer mixture can vary rather widely in monomer content. The mixture must, however, include sufficient N-($C_1$–$C_4$ alkoxymethyl) acrylamide or N-($C_1$–$C_4$ alkoxymethyl)methacrylamide to impart crosslinking capability to the final epoxy ester-acrylate resin, generally 15–25 weight percent of the mixture. It must also include sufficient methacrylic acid to obtain an acid number of between about 35 and about 150, preferably between about 40 and about 90, in order to ensure water reducibility when the epoxy ester-acrylate is neutralized.

In forming a coating composition containing the acidic resin, the resin is neutralized with a tertiary amine, ammonia or ammonium hydroxide to a pH of about 7.0 to about 9.0. Typical amines utilizable include triethylamine, tripropyl amine, dimethylethanol amine, diethylethanol amine, dimethylethyl amine and methyldiethyl amine.

The solvent system used in the coating composition will include alcohols, alkoxy ethanols, ketones and alkyl ethers of diethylene glycol. Suitable alcohols are those having between about 2 and about 8 carbon atoms and having a boiling point up to about 180° C. Non-limiting examples of utilizable alcohols include special denatured ethanols (Formula 1), propanol, butanol, isobutanol, t-butanol, pentanol, hexanol, 2-methylpentanol, 3-methylpentanol, heptanol, isoheptanol, octanol, isooctanol and 2-ethylhexanol.

The alkoxy ethanols utilizable are those having between 1 and 6 carbon atoms in the alkoxy group. Non-limiting examples include methoxy ethanol, ethoxy ethanol, butoxy ethanol and hexoxy ethanol. Also utilizable are propoxy propanol and butoxy propanol.

The ketones utilizable are aliphatic ketones containing between 3 and 8 carbon atoms. Non-limiting examples of utilizable ketones are acetone, diethyl ketone, methylethyl ketone, methylpropyl ketone, methyl isobutyl ketone, methylamyl ketone, methylhexyl ketone, ethylpropyl ketone, ethylbutyl ketone, ethylamyl ketone and methoxy acetone.

The utilizable alkyl ethers of diethylene glycol will contain between 1 and 4 carbon atoms in the alkyl group. Non-limiting examples include the monomethyl ether of diethylene glycol, the monoethyl ether of diethylene glycol and the monobutyl ether of diethylene glycol.

In general, alkoxyethanols, ketones and alkyl ethers of diethylene glycol are primarily solvents for resin. Lower alcohols, such as ethanol and t-butanol, also assist in wetting the surface being coated. Higher alcohols, such as iso-octanol, also serve as defoamants. In controlling viscosity of the final coating composition, higher boiling solvents, such as hexoxyethanol, tend to increase viscosity and lower boiling solvents, such as butoxyethanol and methyl ethyl ketone, tend to decrease viscosity.

Although mixtures of organic solvents are highly preferred, satisfactory coating compositions can be prepared using a single alkoxy ethanol, ketone or alkyl ether of diethylene glycol.

In the finished coating composition, the solids content will be about 10 to about 30 weight percent. The volatile system (including amine, ammonia, or ammonium hydroxide) will be between about 90 weight percent and about 70 weight percent of the finished coating composition, preferably about 75-85 weight percent. About 65 to 90 weight percent of the volatile system will be water and the balance (35 to 10 weight percent) will be organic volatile solvents, including amine, ammonia, or ammonium hydroxide. Preferably, the ratio of water to organic volatiles will be about 70:30 to 80:20 in the volatile system. Each component of the solvent system will be present in between about one weight percent and about 20 weight percent of the weight of the final composition. A typical and preferred solvent system is defined in the working examples.

In the following illustrative examples all parts are parts by weight, unless otherwise indicated.

EXAMPLE 1

A resin kettle was charged with 324.3 g. of a diglycidyl ether of bisphenol A having an epoxide content of 1.14 meq. epoxy/g. and heated to 175° C. to melt the epoxy resin. Dehydrated castor oil fatty acid (77.7 g.) having an acid number 189.1 was added and the temperature reduced to 151° C. Methoxy acetone (16.8 g.) and 1.0 g. tri-n-butylamine were added and the temperature was raised to 150° C. where it was maintained for one hour. At this point, an acid number of 0.6 mg.KOH/g. and an epoxy content of 0.24 meq./g. were obtained. The reaction was cooled to 125° C. and 161 g. of Butyl Cellosolve and 161 g. of n-butanol were added. The reaction was cooled to 110° C. and a mixture of 150.8 g. of styrene, 80.4 g. of N-(isobutoxymethyl)acrylamide, 109.2 g. of butyl acrylate, 61.7 g. of methacrylic acid, and 8 g. of t-butylperbenzoate was added dropwise at 108°-110° C. over a two hour period. The reaction was held at 105°-110° C. for one hour, at which point an additional 2 g. of t-butylperbenzoate was added. The reaction was held for an additional 15 min. at 105° C. at which point 49.6 g. of dimethylethanolamine and 50 g. of deionized water were added. An additional 800 g. of deionized water was then added to afford an aqueous dispersion with a pH of 8.55, a Brookfield viscosity of 425 cps (spindle No. 2, speed 60) and a conductivity of 1900 μmhos.

EXAMPLE 2

Panels of aluminum (0.01″ thickness) were coated by wire wound bar application with the formulation prepared as in Example 1. Three different baking schedules and two different film thicknesses were used to demonstrate improvement in cure (MEK double rubs) with increased time-temperature schedules. After cooling, the coated panels were subjected to the following tests:

| Baking Schedule: | 2'-400° F. | 5'-400° F. | 5'-450° F. |
| --- | --- | --- | --- |
| Dry Film Thickness (mils) | 0.2-0.24 | 0.2-0.25 | 0.2-0.25 |
| Gloss | Exc. | Exc. | Good |
| Cross Hatch Adhesion | Exc. | Exc. | Exc. |
| MEK Double Rubs | 4 | 9 | 30 |
| Pencil Hardness | H-2H | H-2H | H-2H |
| Reverse Impact (in.-lb.) | 8 | 12 | 12 |
| Dry Film Thickness (mils) | 0.3-0.36 | 0.34-0.4 | 0.35-0.39 |
| Gloss | Good | Good | Fair-Good |
| Cross Hatch Adhesion | Exc. | Exc. | Exc. |
| MEK Double Rubs | 20 | 40 | 100 |
| Pencil Hardness | H-2H | H-2H | H-2H |
| Reverse Impact (in.-lb.) | 12 | 12 | 12 |

The coating composition of this invention is primarily useful for coating aluminum, tin plated steel, pretreated metals, steel, and metals coated with the same or different resin composition (i.e. a second coat). The coating composition can be used however for coating other substrates such as wood, paper and leather. The most preferred and useful use of the coating composition is for coating of cans, coil stock, and fabricated metal. Coating can be done by any coating procedure well known to those skilled in the art including direct roll-coating, electrodeposition, spraying, flow coating and the like. After coating the substrate, the coating is baked for about 5 seconds to about 5 minutes at between about 250° F. and about 600° F. A typical bake is for about 2 minutes at about 400° F.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A copolymer which is water-dispersible comprising the copolymerization product of
   (A) a polyglycidyl ether of a bisphenol, which polyglycidyl ether is partially esterified with an ethylenically unsaturated fatty acid or a saturated fatty acid; and
   (B) a mixture of monoethylenically unsaturated monomers including methacrylic acid and N-alkoxymethacrylamide or N-alkoxymethylmethacrylamide.

2. A copolymer of claim 1 wherein said polyglycidyl ether of a bisphenol is a diglycidyl ether of Bisphenol A.

3. A copolymer of claim 2 wherein said unsaturated fatty acid is dehydrated castor oil fatty acid and the N-alkoxymethylacrylamide is N-isobutoxymethylacrylamide.

4. A coating composition comprising the copolymer of claim 1 neutralized with amine, ammonium hydroxide or a tertiary amine and diluted with water to a solids content of about 10-30 weight percent.

5. A coating composition comprising the copolymer of claim 2 neutralized with amine, ammonium hydroxide or a tertiary amine and diluted with water to a solids content of about 10-30 weight percent.

6. A coating composition comprising the copolymer of claim 3 neutralized with amine, ammonium hydroxide or a tertiary amine and diluted with water to a solids content of about 10–30 weight percent.

7. A substrate coated with the coating composition of claim 4.

8. A metal substrate coated with the coating composition of claim 4.

9. A metal substrate coated with the coating composition of claim 5.

10. A metal substrate coated with the coating composition of claim 6.

11. A copolymer of claim 1 where (A) is a polyglycidyl ether of a bisphenol, which polyglycidyl ether is partially esterified with an ethylenically unsaturated fatty acid.

12. A copolymer of claim 1 wherein the amount of ethylenically unsaturated fatty acid or saturated fatty acid in (A) is sufficient to react with up to about 75% of the epoxy groups in the polyglycidyl ether of a bisphenol; the amount of N-alkoxymethylacrylamide or N-alkoxymethylmethacrylamide is from 15 to 25 weight percent of the monomer mixture (A); and the amount of methacrylic acid is sufficient to obtain an acid number of about 35 to about 150.

* * * * *